United States Patent [19]
Maruyama et al.

[11] Patent Number: 6,074,217
[45] Date of Patent: *Jun. 13, 2000

[54] COAXIAL CONNECTOR RECEPTACLE

[75] Inventors: Takashi Maruyama, Kanazawa; Toshitaka Kuriyama, Ishikawa-ken; Hiroaki Shimada, Fukui-ken, all of Japan

[73] Assignee: Murata Manufacturing Co., Ltd., Nagaokakyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/645,821

[22] Filed: May 14, 1996

[30] Foreign Application Priority Data

May 25, 1995 [JP] Japan ................................ 7-126087
Jun. 20, 1995 [JP] Japan ................................ 7-153318

[51] Int. Cl.[7] ........................................ H01R 9/09
[52] U.S. Cl. ............................... 439/63; 439/581
[58] Field of Search ........................ 439/63, 578–585, 439/675

[56] References Cited

U.S. PATENT DOCUMENTS 5,078,621  1/1992  Nishikawa et al. ............... 439/581
5,180,315  1/1993  Nagashima ........................ 439/581
5,322,453  6/1994  Resnick et al. ..................... 439/63
5,336,112  8/1994  Nishishita et al. ................. 439/63
5,466,160  11/1995  Ogawa ............................... 439/63

FOREIGN PATENT DOCUMENTS 0 419 938 A2  4/1991  European Pat. Off. .
693 07 279
    T2        9/1996  Germany .

*Primary Examiner*—Hien Vu
*Attorney, Agent, or Firm*—Burns, Doane, Swecker & Mathis, LLP

[57] ABSTRACT

A coaxial connector receptacle which includes a casing, a hole which is formed in the casing and into which a plug with a conductor is to be inserted, a conductive protrusion provided in the hole for the purpose of receiving the conductor when the plug is inserted into the hole, and an access terminal extending from the protrusion along the bottom surface of the casing, wherein the access terminal is embedded in the casing member such that it is exposed so as to allow access from outside. Since the access terminal is embedded in the wall surface of the casing, the receptacle can be made compact in size.

16 Claims, 7 Drawing Sheets

COAXIAL CONNECTOR RECEPTACLE

BACKGROUND OF THE INVENTION

1) Field of the Invention

This invention relates to a coaxial connector receptacle and, in particular, to a coaxial connector receptacle for use in portable communication equipment.

2) Description of the Related Art

A conventional coaxial connector receptacle will be described with reference to FIGS. 13, 14A, 14B, 14C and 15.

In FIG. 13, a coaxial connector receptacle 5 includes a resin case 50 that is equipped with a hole 59 to which a coaxial connector plug is to be attached, a hot terminal that is equipped with a pin-like protrusion 53*a* which is to be brought into contact with a socket of a coaxial connector plug when the coaxial connector plug is attached, and a ground terminal that is equipped with a contact section 54*a* which is to be brought into contact with an outer conductor of the coaxial connector plug and which consists of crests and grooves. The receptacle 5 is produced by fixing the hot terminal and the ground terminal at predetermined positions, pouring resin into the space around these components, and molding the resin.

FIGS. 14A and 14B are sectional views and FIG. 14C is a bottom view of the coaxial connector receptacle. As shown in FIG. 14A, the hot terminal 53 and the ground terminal 54 are encapsulated in the resin case 50. After that, as shown in FIGS. 14B and 14C, the outer terminal portion 53*b* of the hot terminal 53 and the outer terminal portion 54*b* of the ground terminal 54 are bent so as to be brought into contact with the bottom surface of the resin case 50. The outer terminal portions 53*b* and 54*b* on the bottom surface of the device serve as an interface for connection to the wiring on the circuit board.

A problem in such a conventional coaxial connector receptacle is that its height is rather large as compared with that of other types of surface mount electronic devices. When a coaxial connector plug is attached to such a conventional receptacle, its height is further increased. Since the resin which has been used for the conventional resin case is PPS (polyphenylene sulfide), the minimum wall thickness that allows molding is 0.3 mm. Further, since the minimum thickness of the terminal is 0.15 mm, the height h in FIG. 14B is 0.45 mm at the least. When, as shown in FIG. 15, the terminals 53*b* and 54*b* are extended horizontally, a reduction in height can be achieved by the thickness of the terminals. In that case, however, the horizontal dimension W of the device increases, resulting in an increase in the requisite area for mounting.

Further, when PPS resin is used, burrs or an uneven surface may be generated in the interface between the resin case 50 and the metal terminals when the resin case is molded.

Also, in the conventional coaxial connector receptacle, the ground member 54 forms a wall surface which is perpendicular with respect to the bottom of the hole 59, so that the grooves for the engagement with the outer conductor of the coaxial connector plug cannot be made deep, with the result that the binding force between the plug and the receptacle is relatively small. Further, since the outer conductor of the plug and the ground member 54 are held in contact with each other mainly through the intermediation of the contact section 54*a*, the contact area between the two components is relatively small. Additionally, since the forward end of the outer conductor of the coaxial connector directly comes into contact with the bottom surface of the hole 59, the bottom surface is cut away or worn away when the plug is attached and detached, with the result that the contact between the outer conductor of the plug and the ground member 54 of the receptacle is adversely affected.

SUMMARY OF THE INVENTION

In accordance with this invention, a coaxial connector receptacle with a relatively small height is provided.

Further, according to this invention, there is provided a coaxial connector receptacle in which the electrical contact between the coaxial connector plug and the ground member is more reliably effected.

In a coaxial connector receptacle according to this invention, the hot terminal and the ground terminal are arranged near the bottom a hole or cavity in a top surface of the resin case, and part of the hot terminal and part of the ground terminal are made flush with the outer wall surface of the resin case so as to expose part of the terminals.

Further, in a coaxial connector receptacle according to this invention, a recess or a protrusion is provided in the lower section of the pin-like protrusion of the hot terminal, where the pin-like protrusion and the resin are in contact with each other.

Further, in a coaxial connector receptacle according to this invention, the sectional configuration of a disc-like member of the base section of the hot terminal is such that its diameter is gradually diminished in the downward direction, and the bottom of the hot terminal is embedded in the resin case and, at the same time, the bottom surface of the hot terminal is exposed.

Further, in a coaxial connector receptacle according to this invention, the material of the resin case is a resin material whose dielectric constant at 1 MHz is 4.5 or less and which allows molding in a wall thickness of 0.2 mm or less.

Further, in a coaxial connector receptacle according to this invention, the material of the resin case is a liquid crystal polymer.

Further, in a coaxial connector receptacle according to this invention, the material of the resin case is a denatured polyamide 6T.

In a coaxial connector receptacle according to this invention, a ground member is provided so as to extend from the upper surface of the resin case and over substantially the entire inner peripheral surface of the hole, which is provided in the resin case, and a recess which is to be engaged with the forward end of the outer conductor of the plug is formed in the vicinity of the bottom of the hole.

In a coaxial connector receptacle according to this invention, the cross-sectional diameter of the ground member on the inner peripheral surface of the hole is gradually diminished from the upper end of the opening toward the center of the ground member.

In a coaxial connector receptacle according to this invention, the ground member extends along the bottom surface of the hole, and the forward end of the outer conductor of the plug and the ground member abut each other.

In a coaxial connector receptacle according to this invention, a bevelled portion is provided at the edge of the hole of the resin case so that the plug can be easily inserted.

In a coaxial connector receptacle according to this invention, the hot terminal is provided in the vicinity of the bottom surface of the resin case, and part of the hot terminal is exposed through the bottom surface or the side surface of the resin case to allow access to the hot terminal from outside, so that there is no need to draw a part of the hot terminal out of the case, thereby reducing the height of the receptacle. Further, since the base portion of the pin-like protrusion is filled with resin, it is possible to prevent the hot terminal from being detached from the resin case.

In a coaxial connector receptacle according to this invention, a recess or a protrusion is provided at the base section of the pin-like protrusion, whereby the binding force between the hot terminal and the resin is increased.

In a coaxial connector receptacle according to this invention, the cross-sectional configuration of the disc-like member of the bottom portion of the hot terminal is such that its diameter is gradually diminished downwards, so that the hot terminal is not easily detached from the bottom surface of the resin case.

In a coaxial connector receptacle according to this invention, the resin case is formed of a resin material whose dielectric constant with respect to a signal if 1 MHz is 4.5 or less and which allows molding in a wall thickness of 0.2 mm or less. By using a resin material having a low dielectric constant, the electrostatic capacity that is generated between the hot terminal and the ground terminal can be kept at a low level even if the wall thickness of the resin case is reduced for the purpose of achieving a reduction in size.

In a coaxial connector receptacle according to this invention, a liquid crystal polymer is used as the above-mentioned material of the resin case. This liquid crystal polymer has a dielectric constant of 4.5 or less with respect to a signal of 1 MHz and allows molding in a wall thickness of 0.2 mm or less. Accordingly, the electrostatic capacity that is generated between the hot terminal and the ground terminal can be kept at a low level even when the wall thickness of the resin case is reduced.

In a coaxial connector receptacle according to this invention, a denatured polyamide 6T is used as the material of the resin case. This denature polyamide 6T has a dielectric constant of 4.5 or less with respect to a signal of 1 MHz and allows molding in a thickness of 0.2 mm or less. Accordingly, the electrostatic capacity generated between the hot terminal and the ground terminal can be kept at a low level even when the wall thickness of the resin case is reduced.

In a coaxial connector receptacle according to this invention, the cross section of the ground member is such that its diameter is smaller at a level substantially corresponding to half the depth of the hole than at the level of the opening, so that the outer conductor can be easily inserted and, after the insertion of the outer conductor, the outer conductor and the ground member can be brought into contact with each other more firmly.

In a coaxial connector receptacle according to this invention, the forward end of the outer conductor of the plug comes into contact with the ground member, so that the bottom surface of the hole of the resin case is not cut away.

In a coaxial connector receptacle according to this invention, bevelling of the cross section of the ground member is effected in the vicinity of the opening of the hole 59, so that the insertion of the plug is facilitated.

DESCRIPTION OF THE PREFERRED EMBODIMENTS

The construction of a coaxial connector receptacle according to a first embodiment of this invention will be described with reference to FIGS. 1 through 3.

Figure 1:
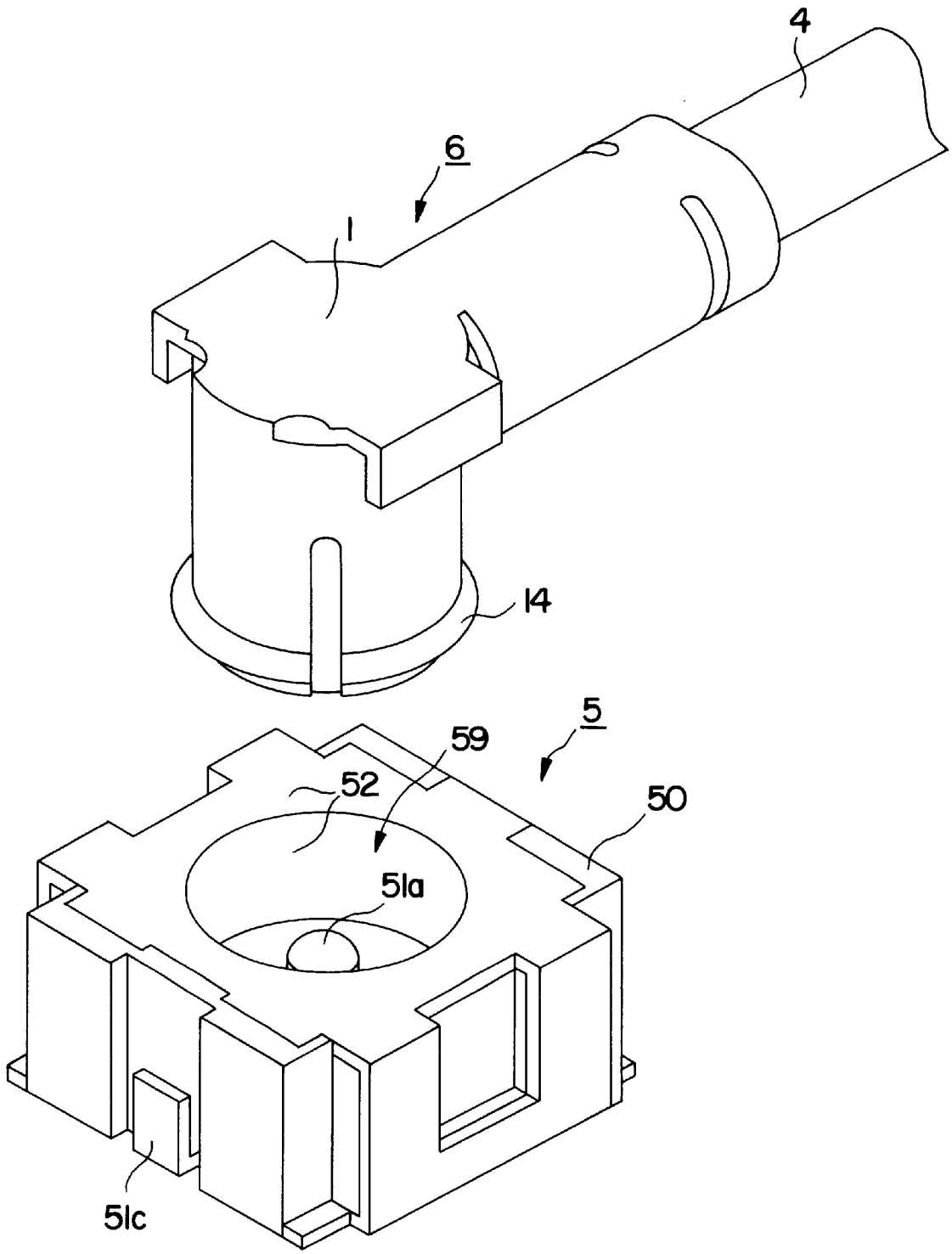
FIG. 1 is a perspective view showing a coaxial connector receptacle according to this invention and a plug to be inserted into it.

In FIG. 1, a receptacle 5 includes a resin case 50 that is equipped with a hole or cavity 59 to which a plug 6 is attached, a hot terminal that is equipped with a pin-like protrusion 51a which comes into contact with the central conductor (not shown) of the plug 6 when the plug 6 is attached, and a ground terminal 52 which comes into contact with the outer conductor of the plug 6. This receptacle 5 is used as a surface mounting part. The plug 6 includes a housing 1 serving as the outer conductor and has a protrusion 14 in a cylindrical section at the forward end thereof. A coaxial cable 4 is connected to this plug 6.

Figure 2A:
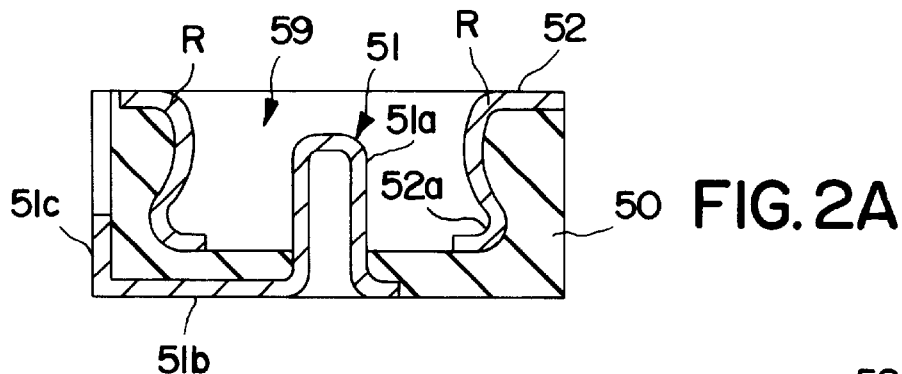
FIG. 2A is a sectional view of the receptacle.
Figure 2B:
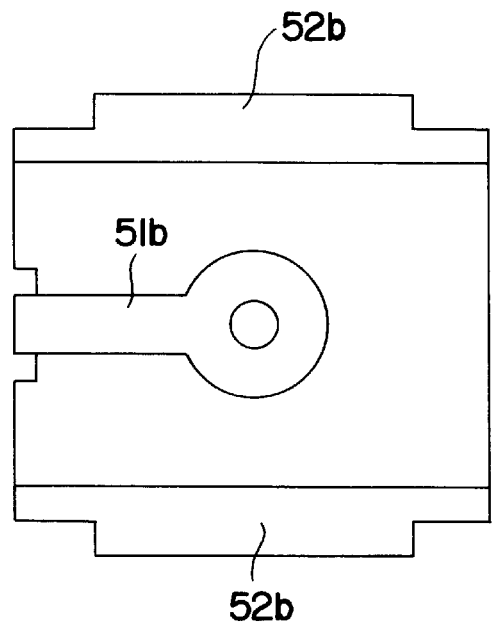
FIG. 2B is a bottom view of the same.
Figure 3:
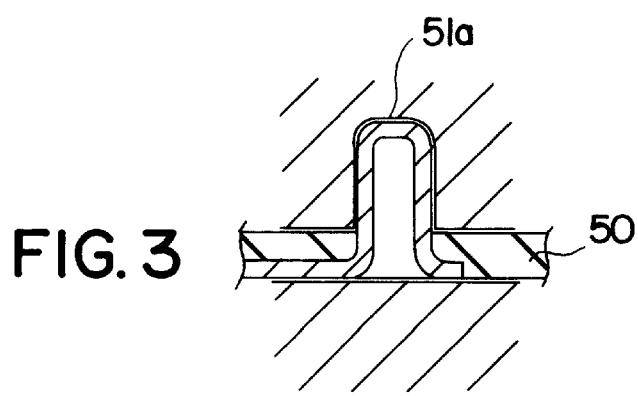
FIG. 3 is a sectional view showing how a hot terminal is secured in position during resin molding.

As shown in FIG. 2A, in this coaxial connector receptacle, the ground member 52 is fitted onto the inner peripheral surface of the hole 59 of the resin case 50. In a part of the ground member 52, there is provided a recess 52a for engagement with the protrusion 14 of the plug 6. The forward end of the ground member 52 is extended in the direction of the center of the hole along the bottom surface of the hole portion of the resin case 50 to the position where the forward end of the outer conductor 1 reaches when the plug 6 is inserted. At the opening of the hole 59, the ground member 52 is formed such that a curved surface R is formed. Further, as shown in FIGS. 1 and 2B, this ground member 52 is extended to a part of the bottom surface by way of the side surface of the resin case 50, forming a bottom portion 52b of the ground portion at the bottom of the resin case.

Figure 2C:
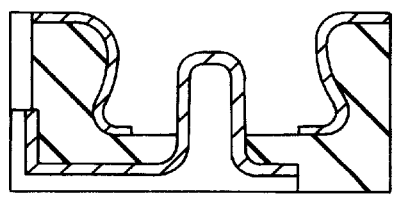
FIG. 2C is a sectional view of another coaxial connector receptacle according to this invention.

The hot member 51 has a pin-like protrusion 51a and a bottom portion 51b. Its forward end 51c may be extended to cover part of the side surface of the receptacle 50. The portion 5ic may be extended to the right rather than the left as seen in the drawing. Resin fills around the base section the pin-like protrusion 51a. Since resin is filled up to the base section of the pin-like protrusion 51a, the resin contracts in the radial direction of the hole 59 during resin molding, and the base section of the pin-like protrusion 51a is firmly held by the resin case. The bottom portion 51b and the side portion 51c of the hot member 51 are exposed through the bottom surface and the side surface of the resin case 50 to thereby allow access from outside. That is, when the receptacle 5 of this invention is mounted on the circuit board, the bottom section 51b comes into direct contact with the wiring pattern on the circuit board. Of course, depending on the board for mounting, the bottom portion 51b and the side portion 51c may be arranged so as to be recessed from the outer surface of the resin case (FIG. 2C).

As the material for the resin case SO, a liquid crystal polymer, such as "VECTRA" (the name of a product of Hextra Ceranies), can be used. This liquid crystal polymer has a heat resistance of 260° C or more. Its dielectric constant with respect to a signal of 1 MHz is 4.5 or less, and it allows molding in a wall thickness of 0.2 mm or less. By using this material, no burrs are generated in the interface between the hot terminal or the ground terminal and the resin of the resin case, thereby preventing a defective contact.

Alternatively, as the material for the resin case 50, a denatured polyamide 6T, such as "Ahren" (the name of a product of Mitsui Petrochemical Industries, Ltd.), can be used. This resin material also has a heat resistance of 260° C or more, and its dielectric constant at 1 MHz is 4.5 or less, allowing molding in a wall thickness of 0.2 mm or less.

The receptacle is prepared as follows: the hot terminal is held from above and below at the apex of the pin-like protrusion 51a and the bottom thereof (FIG. 3) and the space around it is filled with resin, which is molded. Though not shown, before the resin filling, the ground member is also fixed in a predetermined position.

Figure 4:
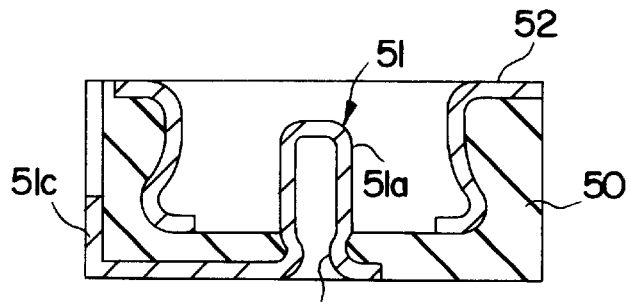
FIG. 4 is a sectional view of a coaxial connector receptacle according to this invention.

In the receptacle of the present invention shown in FIG. 4, a constriction 51d is formed at the base of the pin-like protrusion 51a of the hot terminal 51. Since resin gets into this constriction 51d, the binding strength between the resin case 50 and the hot terminal 51 is increased.

Figure 5:
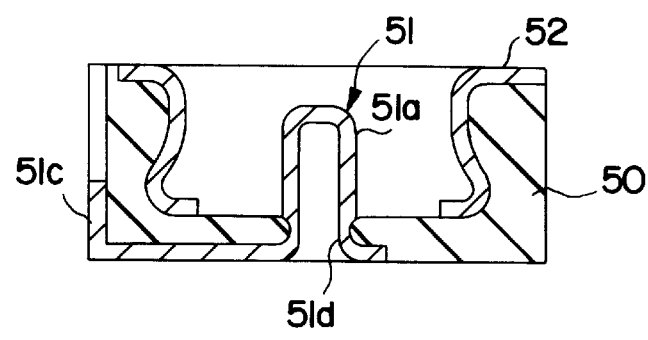
FIG. 5 is a sectional view of a coaxial connector receptacle according to this invention.

In the receptacle of the present invention shown in FIG. 5 also, a constriction 51d is formed at the base of the pin-like protrusion 51a. The configuration of the constriction 51d differs from that of FIG. 4 in that there is a difference in wall thickness in the constriction.

Figure 6:
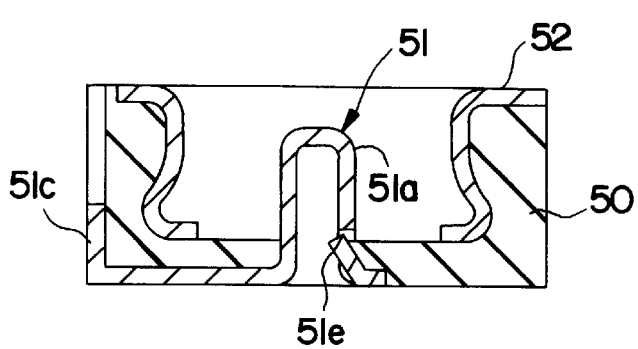
FIG. 6 is a sectional view of a coaxial connector receptacle according to this invention.

Instead of a constriction, it is also possible to form a cut-and-raised portion 51e as shown in FIG. 6.

Figure 7:
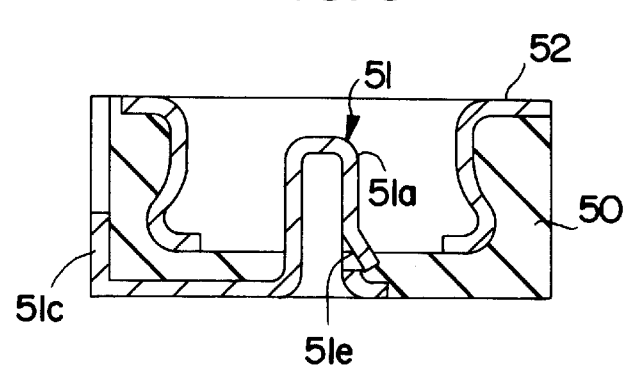
FIG. 7 is a sectional view of a coaxial connector receptacle according to this invention.

The configuration of the cut-and-raised portion may be one as shown at 51e in FIG. 7. In any case, the constriction 51d and the cut-and-raised portion are formed such that the contact area between the resin and the protrusion is large.

Figure 8:
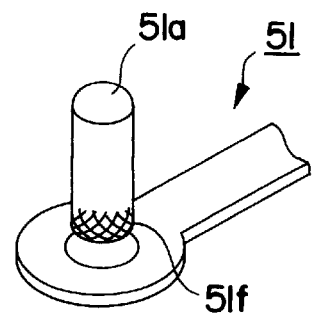
FIG. 8 is a partial perspective view of a hot terminal used in a coaxial connector receptacle according to this invention.

In another aspect of the present invention, a hot terminal as shown in FIG. 8 is provided, in which a knurled portion 51f is provided at the base of the pin-like protrusion 51a of the hot terminal 51, whereby the binding strength between the resin case 50 and the hot terminal 51 is increased.

Figure 9A:
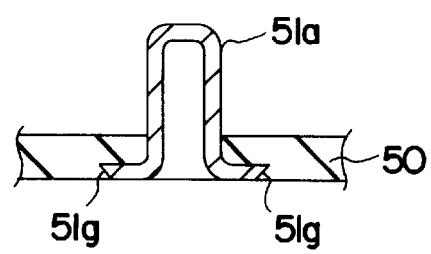
FIG. 9A is a sectional view of a protrusion of a coaxial connector receptacle according to this invention.
Figure 9B:
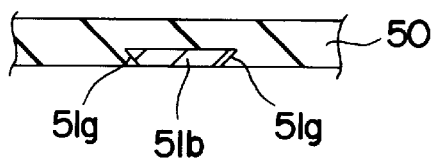
FIG. 9B is a sectional view of the terminal portion of a coaxial connector receptacle according to this invention.

In the present invention, part of the hot terminal 51 is exposed through the casing of the receptacle, so that it is desirable for the hot terminal 51 to be constructed such that it is not detached from the casing. As shown in FIG. 9A, the sectional configuration of the disc-like portion at the bottom of the hot terminal 51 is made such that its thickness is gradually diminished downwards to form a bevel 51g, as seen in the drawing. Further, as shown in FIG. 9B, the cross section of the bottom portion 51b is formed such that its width is gradually diminished downwards to form a bevel shape as seen in the drawing. In this way, the hot terminal 51 is prevented from being detached from the resin 50.

Figure 10A:
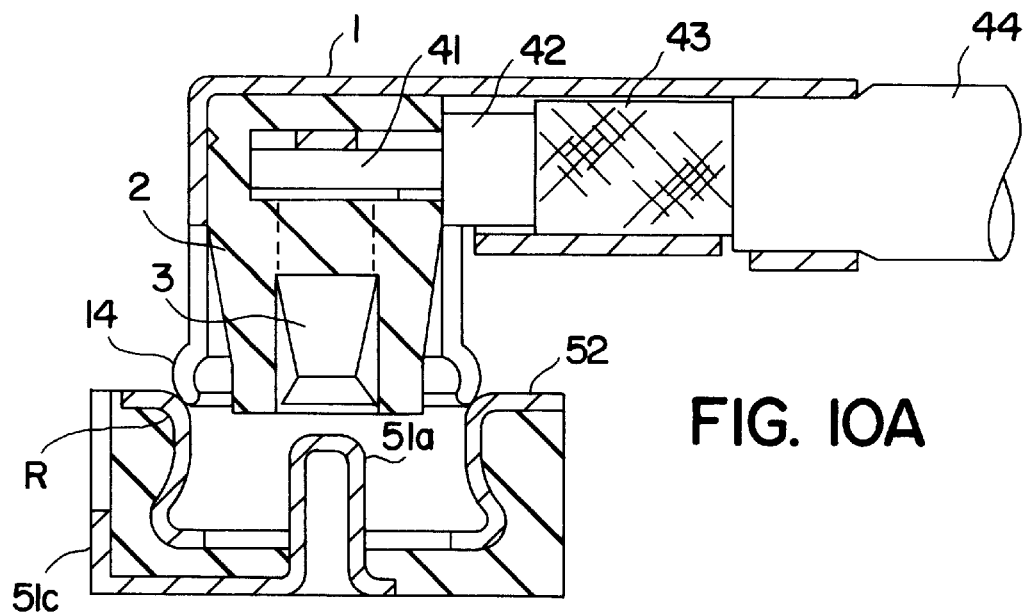
FIGS. 10A, 10B and 10C are sectional views showing procedures for attaching a plug to a receptacle.
Figure 10B:
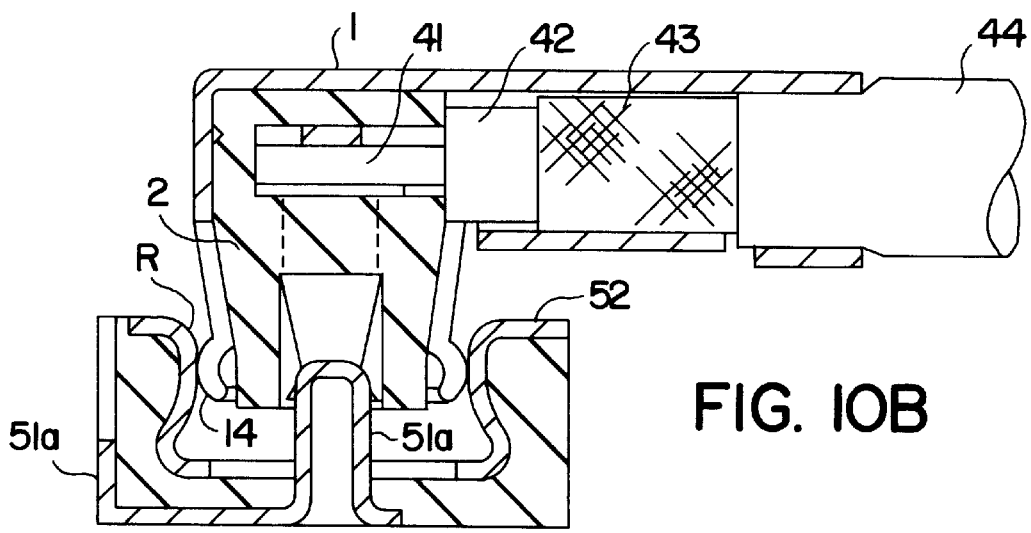
Figure 10C:
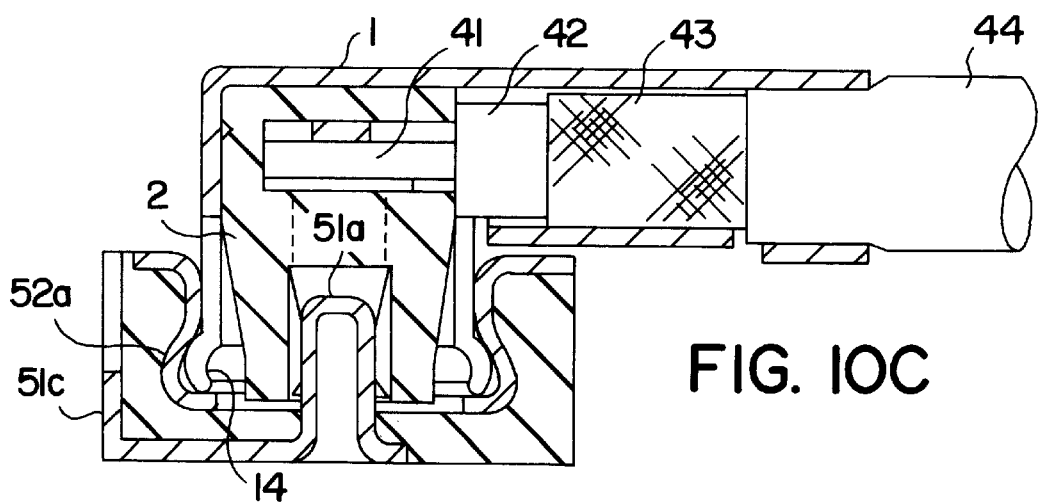

Next, procedures for attaching the plug 5 to the receptacle 6 will be described with reference to FIGS. 10A through 10C. Numeral 41 indicates the central conductor of the coaxial cable; numeral 42 indicates an insulator; numeral 43 indicates an outer conductor; and numeral 44 indicates an outer covering. As shown in the drawings, the central conductor 41 of the coaxial cable is electrically connected to the socket 3, and the outer conductor 43 of the coaxial cable is electrically connected to the housing 1. When this plug 6, to which the coaxial cable has been connected, is inserted into the receptacle 5, the forward end portion of the plug 6 is smoothly narrowed due to the bevelled portion R formed at the edge of the hole 59. After this, the plug 6 is further pushed in, whereby the cylindrical portion of the housing 1 is expanded again due to its resilience, and the protrusion 14 provided on the housing is engaged with the recess 52a of the ground member 52 to thereby secure an electrical connection. Further, as shown in FIG. 10C, the forward end of the outer conductor of the plug abuts the ground member 52, so that the bottom surface of the resin case 50 is not cut or worn away by the forward end of the plug. Further, in this process, the socket 3 comes into contact with the pin-like protrusion 51a of the hot member of the receptacle to thereby secure an electrical connection.

Figure 11A:
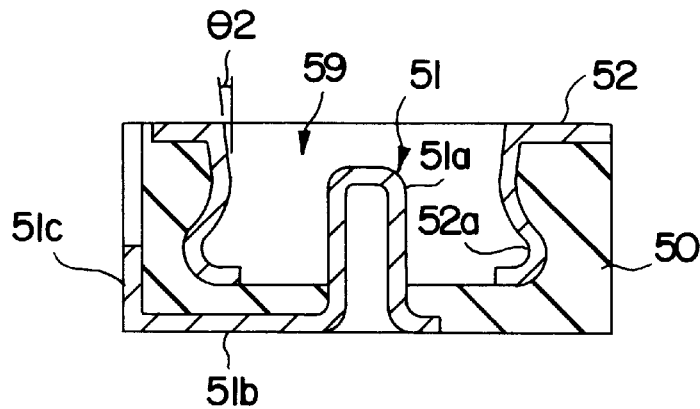
FIGS. 11A and 11B are sectional views of a coaxial connector receptacle according to this invention.
Figure 11B:
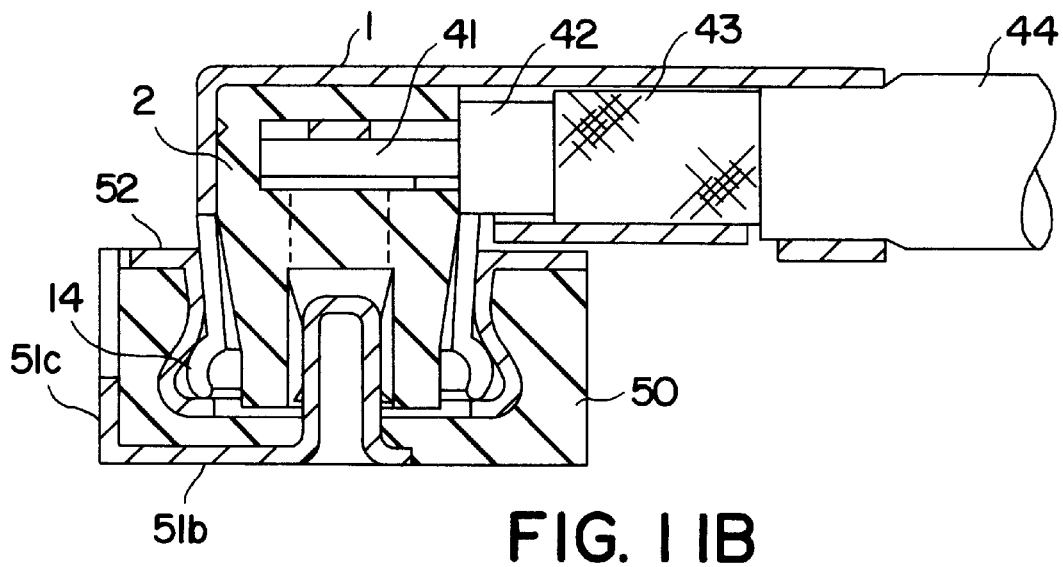

Further, as shown in FIG. 11A, in a receptacle according to the present invention, the sectional configuration of the ground member 52 may be tapered at the opening of the hole 59 of the resin case 50. In the drawing, θ2 indicates the tapering angle. As shown in FIG. 11B, the plug is engaged with the ground member 52 with the forward end portion of the cylindrical section of the housing 1 being narrowed. Thus, the electrical contact area between the outer conductor of the plug and the ground member is large.

Figure 12A:
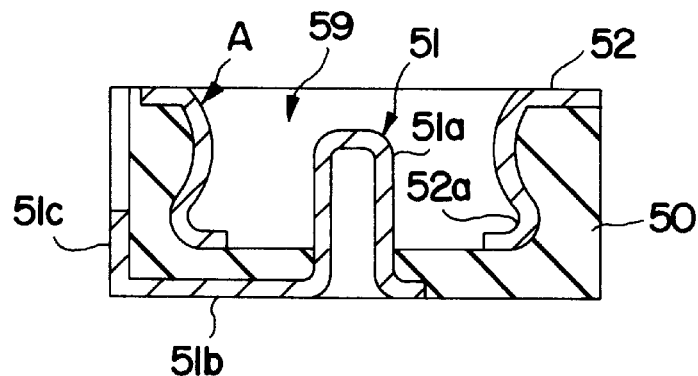
FIGS. 12A and 12B are sectional views of a coaxial connector receptacle according to this invention.
Figure 12B:
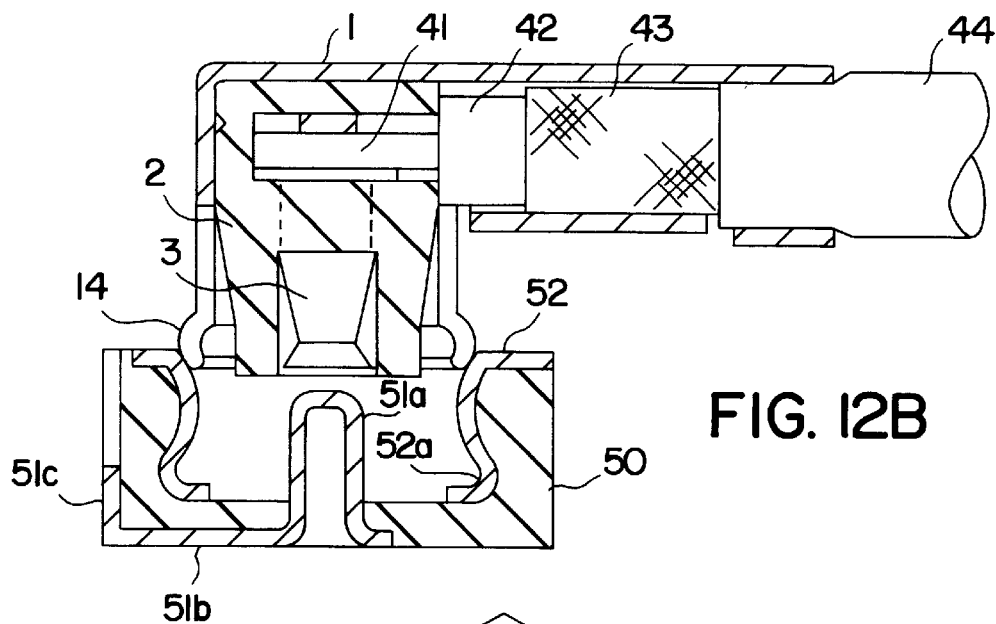
Figure 13:
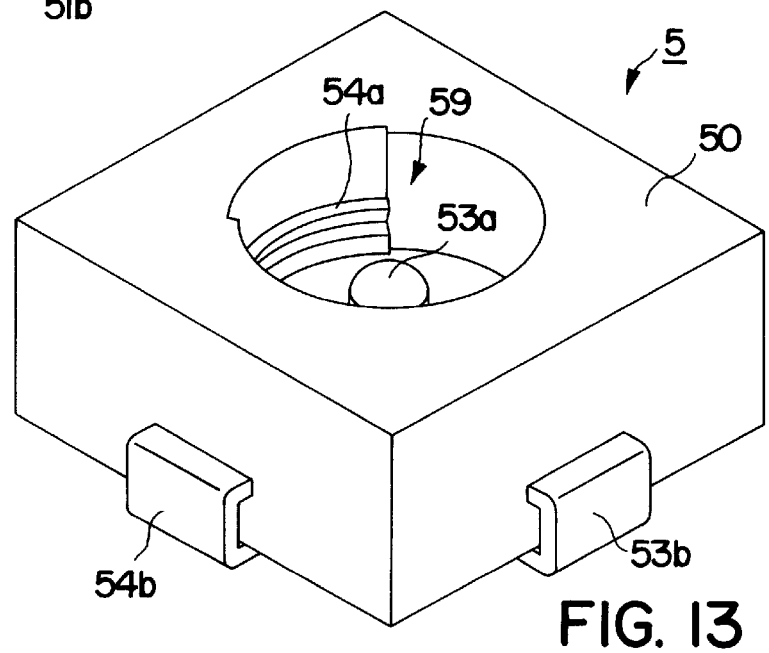
FIG. 13 is a perspective view of a conventional coaxial connector receptacle.
Figure 14A:
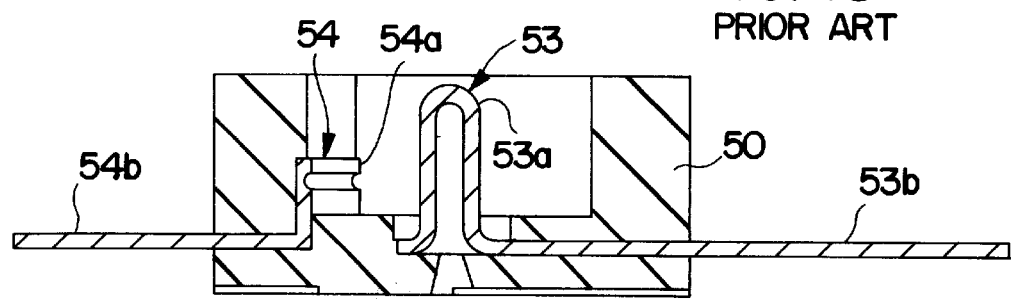
FIGS. 14A and 14B are sectional views and FIG. 14C is a bottom view of the conventional coaxial connector receptacle.
Figure 14B:
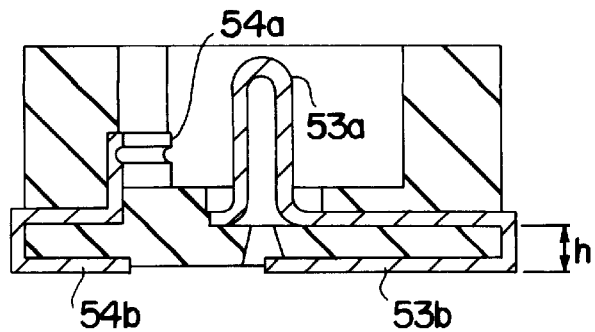
Figure 14C:
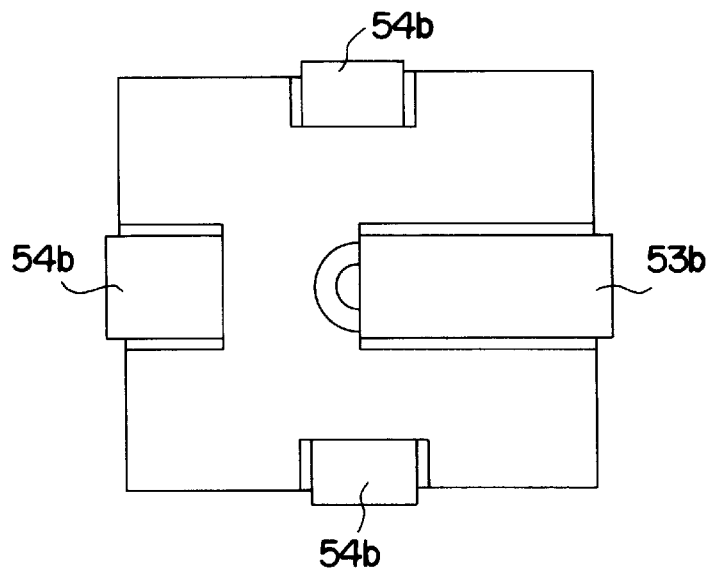
Figure 15:
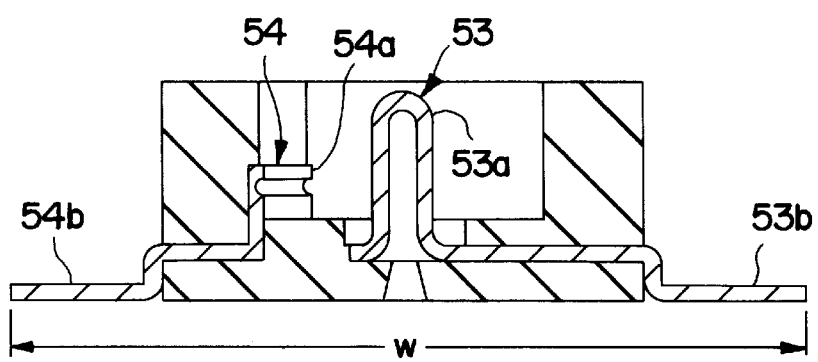
FIG. 15 is a sectional view showing the construction of the conventional coaxial connector receptacle.

Further, as shown in FIGS. 12A and 12B, the ground member has a linear bevelled portion A formed at the opening of the hole 59. With this configuration also, the cylindrical section of the housing 1 of the plug is smoothly narrowed when the plug is inserted into the receptacle, whereby deformation of the outer conductor of the plug is prevented.

The invention is not limited to any particular details of the construction set forth in the specification and illustrated in the accompanying drawings. The same may be modified within the scope of the appended claims without departing from the spirit and scope of the invention.

What is claimed is:

1. A coaxial connector receptacle comprising:
   an integrally molded resin case having a top, an outside bottom and outside side surfaces, said resin case including a cavity having inside side surface and an inside bottom surface, said cavity being in said top surface of said resin case to which a coaxial connector plug is to be attached;
   a hot terminal having a pin-like protrusion which comes into contact with a central conductor of said coaxial connector plug when said coaxial connector plug is attached to said coaxial connector receptacle, said hot terminal further including a bottom portion which is exposed through said outside bottom surface of the resin case and extends between a central portion of the outside bottom surface and one of said outside side surface of the resin case, with resin in space around a base section of the pin-like protrusion, and said hot terminal further including means for increasing a binding strength between said integrally molded resin case and said hot terminal; and a ground terminal which comes into contact with an outer conductor of said coaxial connector plug, wherein said ground terminal on said inside side surfaces of said cavity extends along said inside bottom surface of said cavity of said resin case from said inside side surfaces to a position where said ground terminal abuts a forward end of said outer conductor of said coaxial connecting plug to prevent said forward end of said outer conductor of said coaxial connecting plug from coming into direct contact with said inside bottom surface of said cavity when said plug is inserted into said cavity.

2. A coaxial connector receptacle according to claim 1, wherein said means for increasing binding strength includes one of a recess and a protrusion provided in the base section of said pin-like protrusion.

3. A coaxial connector receptacle according to claim 1, wherein said means for increasing binding strength includes a sectional configuration of the bottom portion of said hot terminal which is tapered so as to be gradually narrowed toward the outside side surfaces of the resin case, and wherein the hot terminal is embedded such that its exposed surface is substantially flush with the outside bottom surface of the resin case.

4. A coaxial connector receptacle according to claim 1, wherein the resin case is made of a resin material whose dielectric constant at 1 MHZ is 4.5 or less and which allows molding at a wall thickness of 0.2 mm or less.

5. A coaxial connector receptacle according to claim 1, wherein the resin case is made of a liquid crystal polymer.

6. A coaxial connector receptacle according to claim 1, wherein the resin case is made of a denatured polyamide 6T.

7. A coaxial connector receptacle according to claim 1, wherein an opening edge of the cavity is beveled and wherein the ground terminal is provided so as to extend along the top surface of the resin case.

8. A coaxial connector receptacle to which a coaxial connector plug having a resilient cylindrical outer conductor and an outwardly expanded portion formed at a forward end thereof is to be attached, said coaxial connector receptacle comprising:

an integral resin case having a cavity in a top surface thereof to which said coaxial connector plug is to be attached;

a hot terminal having a pin-like protrusion which comes into contact with a central connector of the plug when said plug is attached, and said hot terminal ether including means for increasing a binding strength between said integral resin case and said hot terminal; and a ground member which comes into contact with the outer conductor of said plug, wherein said ground member is provided so as to extend from said top surface of the resin case to substantially an entire inner peripheral surface of said cavity, wherein said ground member includes a recess which comes into contact with said expanded portion of the outer conductor of said plug at an inner end of said cavity, and wherein said ground member on said inner peripheral surface of said cavity extends along an inside bottom surface of the cavity of said resin case from said inner peripheral surface to a position where said ground member abuts a forward end of said outer conductor of said plug to prevent said forward end of said outer conductor of said plug from coming into direct contact with said inside bottom surface of said cavity when said plug is inserted into said cavity.

9. A coaxial connector receptacle according to claim 8, wherein a portion of the ground member on the inner peripheral surface of said cavity is tapered such that it is gradually narrowed.

10. A coaxial connector receptacle according to claim 8, wherein an opening edge of said cavity is bevelled.

11. A coaxial connector receptacle comprising:

a case having a top surface an outside bottom surface and outside side surfaces;

a cavity which is formed in said top surface of the case into which a plug with a conductor is to be inserted;

a conductive protrusion provided in said cavity for a purpose of receiving said conductor when said plug is inserted into said cavity and extending to said bottom surface of said case;

a bottom terminal extending from said protrusion along said outside bottom surface of said case, wherein said bottom terminal is partially embedded in said case so as to be exposed along an entire length of said bottom terminal to thereby allow access from outside, and said bottom terminal further including means for increasing a binding strength between said case and said bottom terminal; and a second terminal which is independent of said bottom terminal, said second terminal extending along an inner wall surface of said cavity and establishing an electrical contact with another conductor of said plug and extending along an inside bottom surface of said cavity to a position which prevents a forward end of said plug from coming into direct contact with said inside bottom surface of said cavity when said plug is inserted into said cavity.

12. A coaxial connector receptacle according to claim 11, wherein the exposed surface of said bottom terminal is substantially flush with one of said outside side surfaces of said case and forms a part of said one outside side surface.

13. A coaxial connector receptacle according to claim 11, wherein said bottom terminal is provided at a position recessed from the one outside side surface of said case and such that part of said bottom terminal is exposed.

14. A coaxial connector receptacle according to claim 11, wherein said bottom terminal increases in width as it extends from the outside bottom surface of said case to a central part of said outside bottom surface of the case.

15. A coaxial connector receptacle according to claim 11, wherein the second terminal extends to the outside of said case starting at a mouth portion of said cavity.

16. A coaxial connector receptacle according to claim 11, wherein an extended portion of said second terminal is embedded in one of said outside side surfaces of said case and a part of said external portion of said second terminal is exposed so as to form a part of said one outside side surface.

* * * * *